June 16, 1964     J. ANDRAS     3,137,232
SPACE EXPLORATION ROCKET
Filed March 4, 1959     2 Sheets-Sheet 1
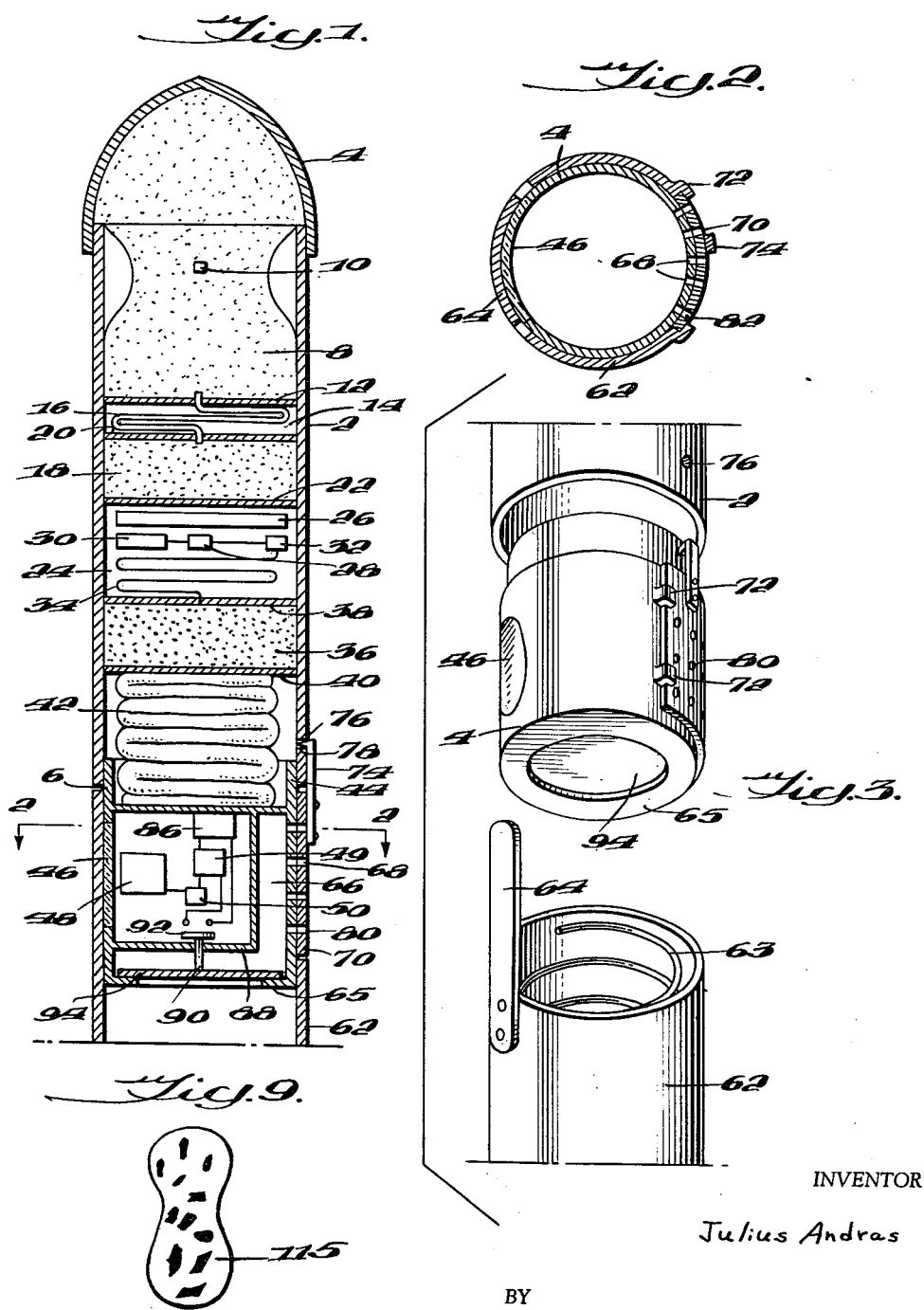
INVENTOR
Julius Andras
BY
Bailey, Stephens & Huettig
ATTORNEYS June 16, 1964   J. ANDRAS   3,137,232
SPACE EXPLORATION ROCKET
Filed March 4, 1959   2 Sheets-Sheet 2
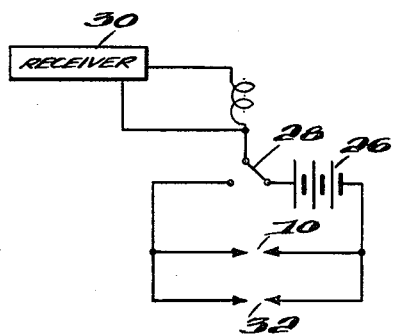
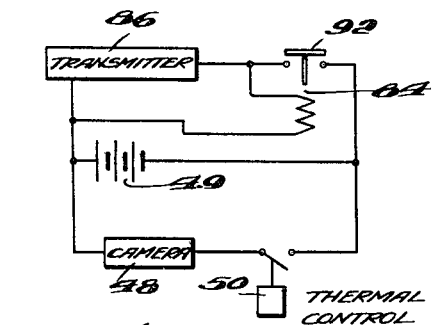
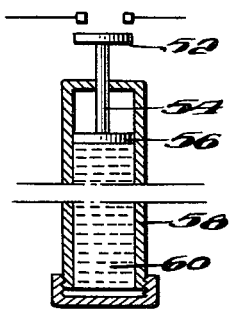
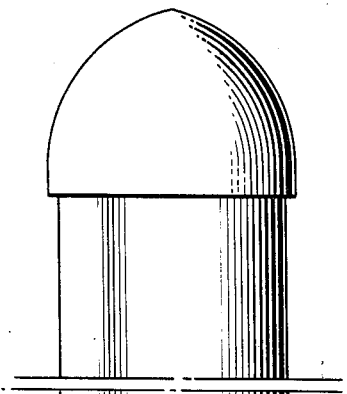
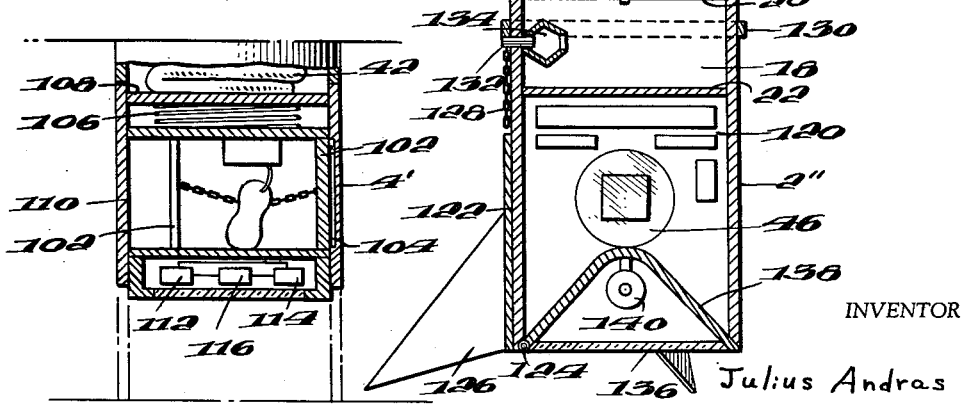
INVENTOR
Julius Andras
BY Bailey, Stephens & Huettig
ATTORNEYS United States Patent Office
3,137,232
Patented June 16, 1964

3,137,232
SPACE EXPLORATION ROCKET
Julius Andras, 1716 I St. NW., Washington, D.C.
Filed Mar. 4, 1959, Ser. No. 797,120
10 Claims. (Cl. 102—49)

The invention relates to rockets, and more particularly to rockets for the exploration of space and the investigation of conditions above the earth's atmosphere.

The primary object of the invention is to provide a rocket by which conditions in space can be studied and the results observed.

Another object of the invention is to provide a rocket which, after being put in orbit, can be caused to return to the earth at any desired time and can be landed safely.

A further object of the invention is to provide a rocket capable of taking pictures of the earth from space, in which means are provided for automatically stopping the camera when the rocket is within the earth's shadow so as to avoid waste of film.

Still another object of the invention is to provide a rocket by which the conditions to which a human being working in a space suit in outer space would be subjected can be simulated and a monkey or other animal can be subjected to such conditions.

An additional object of the invention is to provide a rocket formed of a main body and a container separable from each other, the main body containing means for slowing down the rocket and the container having a parachute attached to it for lowering it gently after it is separated from the main body.

Still a further object of the invention is to provide, in a rocket equipped with a camera (which may be a still camera operating at intervals, a motion picture camera or a television camera), and having a window through which the camera operates, with means for protecting the window during take-off of the rocket.

It is also an object of the invention to provide a rocket capable of catching meteoric dust or other particles present in outer space and of preventing loss or contamination of these particles during the return of the rocket to the earth.

The invention further provides transmitting means which are brought into action as the rocket nears the earth for sending out radio or radar signals to permit location and recovery of the rocket when it lands.

Further objects and advantages of the invention will appear more fully from the following description especially when taken in conjunction with the accompanying drawings, which form a part thereof.

In the drawings:

FIG. 1 shows in cross-section a rocket embodying the invention, with a part of an earlier stage propelling unit;

FIG. 2 is a cross-section on the line 2—2 of FIG. 1;

FIG. 3 is a perspective view of a portion of the rocket;

FIGS. 4 and 5 are wiring diagrams;

FIG. 6 is a cross-sectional through the terminal switch;

FIG. 7 shows in cross-section a portion of a modified device;

FIG. 8 is a cross-section through still another modification; and

FIG. 9 shows a test space suit.

In the form of FIGS. 1 to 6, the rocket has a main cylindrical hollow body portion 2, on the front end of which is a frictionally engaged conical cover 4. At the rear end a container 6 is frictionally engaged with the body 2.

In the front end of body 2 is a charge 8 of powder or other propellant which can be fired by an electrical sparking device 10, thereby blowing off cover 4. A wall 12 separates this charge from a space 14 in which is located a fuse 16, which passes through wall 12 so as to be ignited when powder 8 burns out. This fuse may be of any desired length, so as to ignite, a predetermined time after the firing of charge 8, a second charge 18 separated from space 14 by a wall 20 through which the other end of fuse 16 passes.

A wall 22 separates charge 18 from a space 24 in which are located a battery 26 connected by switch 28 to spark gap 10. Switch 28 can be controlled by a radio or radar receiver 30 so as to be remotely controlled from the earth to set off charge 8 at any desired time.

Battery 26 is also connected by switch 28 to a second spark gap 32 which ignites a slow burning fuse 34 connected to a powder charge 36 separated from the space 24 by a wall 38 and enclosed at its rear end by wall 40. Walls 12, 20 and 40 are all slidable in the container, at least when large pressures are applied to them, while walls 22 and 38 are fixed.

Container 4 at its upper end encloses, in conjunction with the lower end of main body 2, a parachute 42 which is connected to the container by cords 44. The container also has at one side a transparent window 46 through which a camera 48 can take pictures. The camera, which may be set to start operating a certain length of time after take-off, is controlled by a battery 49 and temperature controlled switch 50. This switch has a circuit-closing contact 52 on a rod 54 connected to a piston 56 slidable in tube 58. The tube below the piston is filled with mercury 60, so that expansion of the mercury as the temperature rises will close the switch, while its contraction as the temperature drops will open the switch.

The rocket is intended to be placed in orbit by one or more earlier stage propulsion units. The last of these stages is indicated at 62, and this unit is of course detachably secured to the rocket. This stage has a projection 64 which overlies the window 46 to protect it from damage during take-off.

For the collection of meteoric dust, I provide a chamber 66 in the container 4 along a part of the side wall, and in this portion of the side wall are openings 68, a plate 70 is slidably mounted on the outside of this part of the side wall by guides 72. A spring catch 72 connected to plate 70 has a triangular end 76 engaged in a notch 78 in the outer wall of main body 2. Plate 70 has the holes 68, and its movement is limited by a pin-and-slot connection 82.

Also in the container, and connected to battery 49 by a holding switch 84, is a transmitter 86. The container has in its bottom a fixed wall 88 through which projects the pin 90 of contact member 92 of the switch 84, this stem being rigid with a light movable plate 94.

This arrangement operates as follows:

The rocket is put into orbit around the earth by the earlier stage propelling units such as 62. When the rocket is released from unit 62, by the pressure of coil springs 63, which engages flange 65 around plate 94 window 46 is uncovered and the camera begins to take pictures. However, unless the rocket is warmed by the sun, switch 50 will remain open and the camera will not operate. At the same time, meteoric dust will be collected in the space 66.

When the rocket has been in orbit as long as desired, being held in proper position by conventional orienting means, switch 28 is closed by a proper signal from the earth and charge 8 is ignited, blowing off cover 4 and then slowing down the rocket to such a degree that it curves downward towards the earth. After this charge has burned out, it ignites fuse 16 which is timed to set off the second charge 18 at a time when the rocket is approaching the earth's atmosphere, so as to slow the fall of the rocket towards the earth. Shortly after this charge is burned out, fuse 34 ignites charge 36 and pushes the container out of engagement with the main body. The parachute opens and the container floats to the earth at a speed such that the contents will not be injured on landing.

When the container leaves the main body, hook 74 exerts an upward pull on the plate 70 and moves it so as to close holes 68. This pull is only momentary because the head of the lever 74 is pushed out of the hole 78.

As the container falls bottom downward, its speed is sufficient to exert an upward air pressure on plate 94 to move it upward and close switch 84, so that the transmitter begins to send out signals by which the container can be located and recovered.

In this arrangement, scraping of the window 46 by meteoric particles will indicate whether or not it will be necessary to provide protection from such particles for a telescope located in a space station, on the moon or the like.

In the modification of FIG. 7, container 4' is mounted and connected to parachute 42 in the same manner as in FIG. 1. However, the container has a cage 102 slidable in and out of its bottom end, the movement being limited by pin-and-grooves guides 104. A light spring 106 is mounted between the top wall 108 of the container 2' and the capsule. The cage contains a supply of air or oxygen, air purifying mechanism or the like which will support the life of a monkey or other animal.

Also contained in capsule 102 is a transmitter 112 operated through switch 114 by battery 116. Switch 114 may be an inertia switch which is closed by the slowing down of the container when it is blasted away from the main body of the rocket.

The monkey, or other animal, is enclosed in a simulated space suit 115 (FIG. 9). This includes an inner rubber suit filled with air, a layer of glass wool, cotton wool or the like to protect against radiation, and an outer layer of white cloth with a regular or irregular pattern of black spots, stripes or the like to absorb heat from the sun and warm the occupant of the suit.

With this construction, as soon as the rocket leaves the preceding stage, the capsule 102 is pushed out of the container and the animal is exposed to the same conditions as a man in a space suit would be.

When the rocket re-enters the atmosphere and the container is released, the parachute opens and brakes the fall. At the same time, transmitter 112 begins sending. The pressure of the air from below during the fall will push capsule 102 back into the container so as to protect it.

In the form of FIG. 8, there is no separate container. The main body 2'' has a first retarding charge 8 and behind this a second retarding charge 18, controlled as in the other forms. However, fixed wall 22 shuts off charge 18 from a space 120 in which are arranged window 46, batteries 26, 49, receiver 30, camera 48, switch 50 and transmitter 86.

This body 2'' is provided with parachute vanes 122 pivoted at 124 on the body and provided with guiding fins 126. The vanes 122 are connected by cables 128 to a ring 130 slidable on the outside of the body 2''. This ring is held in the position shown by a pin 132 mounted in a hole in the side of the body and extending into a chamber 134 which is filled with powder and which communicates with powder charge 18. This parachute arrangement is described in more detail in my application Serial Number 778,933, for Device for Simulating Free Fall, filed December 8, 1958, now abandoned.

With this structure, when charge 18 is partly burned and has slowed down the rocket, the powder in chamber 134 will ignite and will blow out pin 132, allowing vanes 122 to spread and thus to brake the fall.

This rocket also includes a transparent bottom wall 136 within which is a reflector 138 and light bulb 140. When the reverse rocket is connected with the battery, the radio and light bulb are also connected. This rocket is intended to land in the sea, in inverted position, and the light bulb will facilitate location of the rocket.

While I have described herein some embodiments of my invention, I wish it to be understood that I do not intend to limit myself thereby except within the scope of the claims hereto or hereinafter appended.

I claim:

1. In a rocket apparatus adapted to be put into orbit, a main casing having a fuel charge in the front end thereof, means encasing said charge including a wall opposite the portion of the charge remote from said front end and means preventing substantial rearward movement of said wall to cause said charge to exert a thrust toward said front end for slowing down the rocket so as to bring it out of orbit and cause it to approach the earth's atmosphere, a remote control electric wave responsive means to fire said charge, a second charge behind the first charge for exerting a thrust in the same direction, delay-action means to fire said second charge a substantial time after the consumption of said first charge to slow the rocket further upon approaching the earth's atmosphere, a container removably mounted on the other end of the main casing, a parachute carried within the rocket and operatively connected to said container for parachuting said container to earth, and means operable a predetermined length of time after the firing of the first charge and after exhaustion of the second charge to separate the container from the main casing and to permit opening of said parachute while leaving it connected to said container.

2. In a rocket as claimed in claim 1, said container including a transmitter therein, and air pressure responsive means responsive to the falling of the container through the atmosphere operatively connected to the transmitter to initiate operation of the transmitter.

3. In a rocket apparatus as claimed in claim 1, said container having at least one hole in the wall thereof for the collection of meteoric dust, a closure member, means slidably mounting said closure member on the wall of the container for closing the hole, and means operatively connected to the container and closure member and operable by the separation of the container to move said closure member to closing position.

4. In a rocket apparatus as claimed in claim 1, said container having a window therein, a camera mounted adjacent the window for exposure therethrough, an earlier stage impeller unit releasably connected to said other end of the rocket, said window being located in the side of the container, said impeller unit having a projection extending in the direction of and covering said window.

5. In a rocket apparatus as claimed in claim 1, said container having at least one hole in the wall thereof for the collection of meteoric dust, a closure member, means slidably mounting said closure member on the wall of the container for closing the hole, means to move said closure member to closing position, and means operatively connected to said parachute releasing means to operate said closure member moving means upon operation of said parachute releasing means.

6. In a rocket apparatus as claimed in claim 1, said container having a bottom, a cage mounted in the container for movement outward therefrom through the bottom thereof, and spring means urging said cage out of the container.

7. In a rocket apparatus as claimed in claim 1, said container having a window therein, a camera mounted adjacent the window for exposure therethrough, and temperature-responsive means operatively connected to the camera for starting and stopping the operation thereof as the rocket moves out of the earth's shadow.

8. In a rocket apparatus as claimed in claim 7, an earlier stage impeller unit, means for releasably connecting said impeller unit to said other end of the rocket, means to release said last connecting means, said window being located in the side of the container, said impeller unit having a projection extending in the direction of and covering said window.

9. In a rocket apparatus having a main casing, a container removably mounted on one end of the main casing, means operable at a predetermined time to release the container from the main casing, said container having at least one hole in the wall thereof for the collection of meteoric dust, a closure member slidably mounted on wall of the container for closing said hole, means to move said closure member to closing position, and means operatively connected to said releasing means to operate said closure member moving means upon operation of said releasing means.

10. A rocket having a container at the rear end thereof, said container having a window therein, a camera mounted adjacent the window for exposure therethrough, an earlier stage impeller unit releasably connected to the rear end of the rocket, said window being located in the side of the container, said impeller unit having a projection extending in the direction of and covering said window.

References Cited in the file of this patent

UNITED STATES PATENTS

| | | |
|---|---|---|
| 1,102,653 | Goddard | July 7, 1914 |
| 2,086,087 | Melton | July 6, 1937 |
| 2,645,941 | Reid | July 21, 1953 |
| 2,717,309 | Campbell | Sept. 6, 1955 |
| 2,848,945 | Brumbaugh | Aug. 26, 1958 |
| 2,906,125 | Jewett | Sept. 29, 1959 |

OTHER REFERENCES

"Astronautics," December 1958, vol. 3, #12, page 21.
"Aviation Week," May 5, 1958, vol. 68, #18, pp. 30 and 31 relied on.